(12) United States Patent
Sato

(10) Patent No.: US 9,330,244 B2
(45) Date of Patent: May 3, 2016

(54) CONTROLLER AND METHOD OF STORAGE APPARATUS

(71) Applicant: Toshiyuki Sato, Shizuoka-ken (JP)

(72) Inventor: Toshiyuki Sato, Shizuoka-ken (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 96 days.

(21) Appl. No.: 13/682,882

(22) Filed: Nov. 21, 2012

(65) Prior Publication Data
US 2013/0160112 A1    Jun. 20, 2013

Related U.S. Application Data

(60) Provisional application No. 61/570,939, filed on Dec. 15, 2011.

(51) Int. Cl.
*G06F 21/14*    (2013.01)
*G06F 21/31*    (2013.01)

(52) U.S. Cl.
CPC .................................. *G06F 21/31* (2013.01)

(58) Field of Classification Search
CPC ....... G06F 21/31; G06F 21/44; G06F 21/606; G06F 21/73; G06F 21/78; G06F 21/80; G06F 21/82; G06F 21/572; G06F 21/571; G11B 20/00152; G11B 20/00166; G11B 20/00195; H04L 63/083
USPC ............. 713/18, 19, 22, 28, 34; 726/183, 193
See application file for complete search history.

(56) References Cited

U.S. PATENT DOCUMENTS

| 7,100,036 | B2 * | 8/2006 | Schwartz | 713/2 |
| 7,814,532 | B2 * | 10/2010 | Cromer et al. | 726/2 |
| 7,900,043 | B2 * | 3/2011 | Cho | 713/165 |
| 2001/0037459 | A1 * | 11/2001 | Ogawa et al. | 713/200 |
| 2003/0163717 | A1 * | 8/2003 | Yoshimoto et al. | 713/193 |
| 2012/0124391 | A1 * | 5/2012 | Aono | G06F 21/575 726/19 |

FOREIGN PATENT DOCUMENTS

JP    2008-134902    6/2008

* cited by examiner

*Primary Examiner* — Eleni Shiferaw
*Assistant Examiner* — Paul Callahan
(74) *Attorney, Agent, or Firm* — Amin, Turocy & Watson LLP; Gregory Turocy

(57) ABSTRACT

According to one embodiment, a controller for controlling a connected storage apparatus includes a storage unit and a control unit. The control unit acquires a password input by a user, judges whether or not the password is consistent with a password previously registered in the storage unit, cancels authentication data that is stored in the storage unit and enables reading and writing toward the storage apparatus of data and allows the formatting toward the storage apparatus in a condition that the password is consistent with the password previously registered in the storage unit, and disables reading and writing toward the storage apparatus of data and formatting toward the storage apparatus in a condition that the password is not consistent with the password previously registered in the storage unit.

8 Claims, 5 Drawing Sheets

CONTROLLER AND METHOD OF STORAGE APPARATUS

CROSS-REFERENCE TO RELATED APPLICATION

This application is based upon and claims the benefit of priority from: U.S. provisional application 61/570,939, filed on Dec. 15, 2011; the entire contents all of which are incorporated herein by reference.

FIELD

Embodiments described herein relate to a technology controlling an access to a storage apparatus.

BACKGROUND

In order to prevent the issue or the leakage of data, an HDD (Hard disk drive) with an authentication function is known. For the authentication function, the authentication is carried out before the write in from a machine to the HDD, and the HDD can be accessed only in the condition that the machine succeeds in the authentication. If the authentication fails or the data in the HDD will be read out in the condition that the authentication is not carried out, an encryption key for a data password stored in the HDD is automatically cancelled, so that all the data in the HDD are invalidated. Thus, even though the HDD is stolen and the like, the leakage of the data cannot occur.

However, if the HDD connected with the machine is replaced with a HDD without the authentication function, after the data are written in the HDD, the HDD is issued externally, and the written-in data will be issued outside.

DETAILED DESCRIPTION

According to one embodiment, a controller for controlling a connected storage apparatus includes a storage unit and a control unit. The control unit acquires a password input by a user, judges whether or not the password is consistent with a password previously registered in the storage unit, cancels authentication data that is stored in the storage unit and enables reading and writing toward the storage apparatus of data and allows the formatting toward the storage apparatus in a condition that the password is consistent with the password previously registered in the storage unit, and disables reading and writing toward the storage apparatus of data and formatting toward the storage apparatus in a condition that the password is not consistent with the password previously registered in the storage unit.

Figure 1:
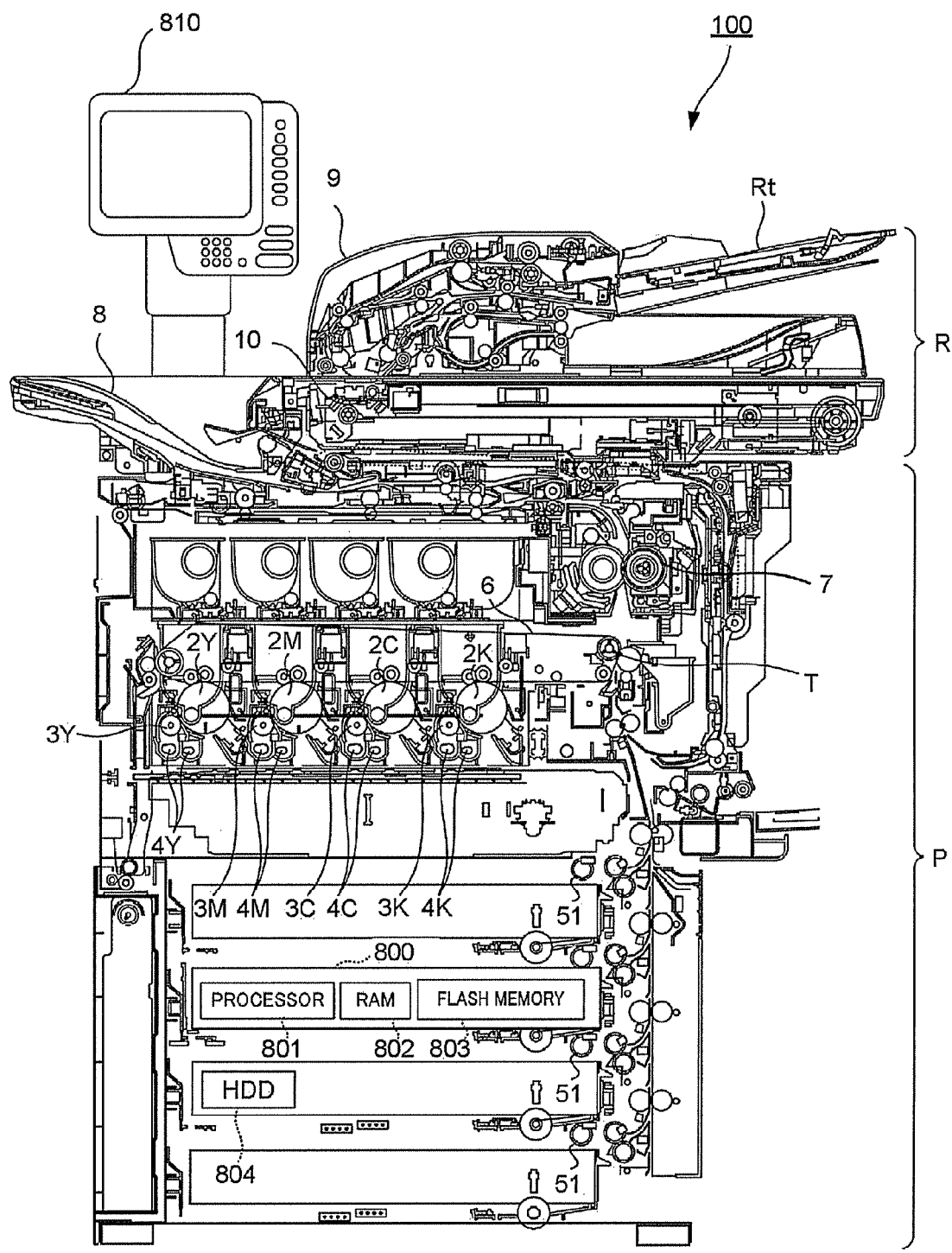
FIG. 1 is a drawing showing an example of apparatus components of an image forming apparatus.

FIG. 1 is a sectional arrangement drawing of an example image forming apparatus (MPF: Multi Function Peripheral) in the embodiment. As shown in FIG. 1, the image forming apparatus 100 comprises a scanning unit R and an image forming unit P.

The scanning unit R has a function of scanning and reading the images of a sheet document and a book document. The scanning unit R comprises a scanning optical system 10 including a plurality of reflecting mirrors and capturing components and comprises an auto document feeder (ADF Auto Document Feeder) 9 capable of automatically feeding a document to a specified bearing place. The images of the document borne on a document tray Rt and automatically fed by the original conveying apparatus 9 and the document borne on a document board which is not shown in figures are read by the scanning optical system 10.

The image forming unit P has a function of forming a developer image on a sheet based on the image read from the document by using the scanning unit R or image data sent from an external machine to the image forming apparatus 100, and the like. In addition, the image forming unit P comprises photoreceptors 2Y-2K, developing rollers 3Y-3K, mixers 4Y-4K, an intermediate transfer belt 6, a fixation apparatus 7 and a discharge tray 8.

The image forming apparatus 100 comprises an HDD 804 and a control board 800, and the HDD 804 is a nonvolatile storage apparatus. The control board 800 comprises a processor 801 which is an arithmetic processing apparatus (such as a CPU (Central Processing Unit) and an MPU (Micro Processing Unit)), a RAM (Random Access Memory) 802 which is a master storage apparatus, and a rewritable flash memory 803 which is a nonvolatile storage apparatus. The processor 801 has an effect of carrying out various kinds of processing in the image forming apparatus 100. The processor 801 further has an effect of realizing various functions by downloading a program previously stored in the flash memory 803 or the HDD 804 in the RAM 802 and executing the downloaded program.

The image forming apparatus 100 further comprises a control panel 810. The control panel 810 comprises an input accepting an instruction from the user and a display unit displaying a processed content or a message and the like towards the user.

Hereinafter, as an example of the processing in the image forming apparatus 100 according to the present embodiment, the summary of copying processing is described. First, the sheet picked up by a pickup roller 51 is supplied into a sheet feeding path. The sheet supplied into the sheet feeding path is fed towards a specified feeding direction by a plurality of roller pairs.

The images of a plurality of sheet documents continuously and automatically fed by the original conveying apparatus 9 are read by the scanning optical system 10.

The control board 800 carries out specified image processing on the image data read from the document by using the scanning unit R. Subsequently, electrostatic latent images of the data after the image processing are formed on the light-sensitive surfaces of the photoreceptors 2Y, 2M, 2C and 2K used for transferring the Y (yellow), the M (magenta), the C (cyan) and the K (black) developer images onto the sheet.

A developer mixed by the mixers 4Y-4K in a developing machine is supplied to the photoreceptors 2Y-2K formed by the electrostatic latent images as described above by the developing rollers (so called Mag rollers) 3Y~3K. Thus, the electrostatic latent images formed on the light-sensitive surfaces of the photoreceptors are developed.

The developer images formed on the photoreceptors in such a way are transferred onto the belt surface of the intermediate transfer belt 6 (so-called primary transfer), and the developer images fed by the rotation of the intermediate transfer belt are transferred onto the sheet to be fed at a specified secondary transfer position T.

The developer images transferred onto the sheet are heated and fixed on the sheet by the fixation apparatus 7. The sheet on which the developer images are heated and fixed is fed in the feeding path by the plurality of feeding roller pairs and is discharged in sequence on the discharge tray 8.

Hereinafter, the control of the control board 800 towards the HDD 804 is described with reference to a flow chart. First, the setup action of the image forming apparatus 100 is described with reference to FIG. 2. The setup, for instance, is an action when the HDD 804 is assembled in the image forming apparatus 100 before a product is produced. In addition, in the following descriptions, the setting of an action main body as the control board 800 is described, but is realized by executing the program downloaded in the RAM 802 by the processor 801 in practice. In addition, part or all of the functions can be also the implementation carried out by an ASIC (Application Specific Integrated Circuit).

When a power supply of the image forming apparatus 100 is switched on by the specified operation of the user, the control board 800 determines whether or not the HDD 804 assembled in the image forming apparatus 100 has an authentication function and further determines whether or not the product or a standard (model) is the previously defined one. As a plurality of the HDDs with the authentication function exist at present, in the present embodiment, the product or the standards (hereinafter, called the type) is further determined. Herein, the control board 800 determines whether or not the type of the HDD 804 is a previously defined type by sending a previously specified signal to the HDD 804 and determining whether or not a returned signal is the specified signal.

If the HDD 804 is the HDD of the specified type with the authentication function, the control board 800 carries out the initialization such as the formatting and the like of the HDD 804, establishes the authentication data of the HDD 804 (ACT 001), and stores the established authentication data in the flash memory 803 (ACT 002). In the present embodiment, an encryption key is previously stored in a specified storage region in the HDD 804, and the control board 800 generates the authentication data consistent with the encryption key by using the encryption key. However, it is to be appreciated that any suitable technique for generating the authentication data can be used.

Figure 2:
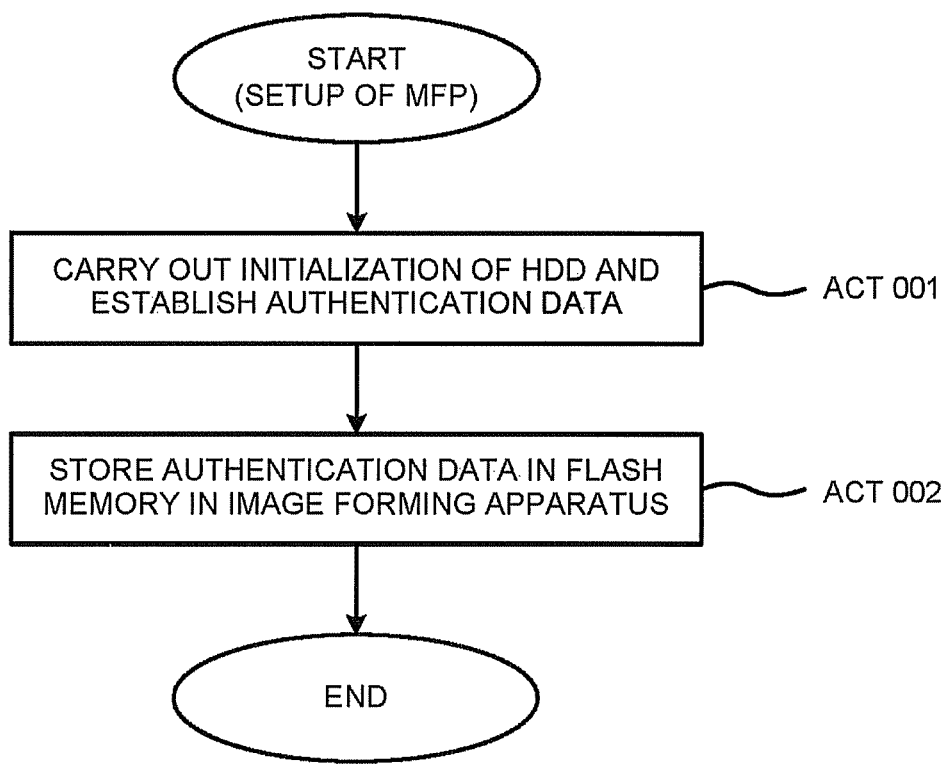
FIG. 2 is a flow chart showing an action example when an HDD is initially connected with the image forming apparatus.
Figure 3:
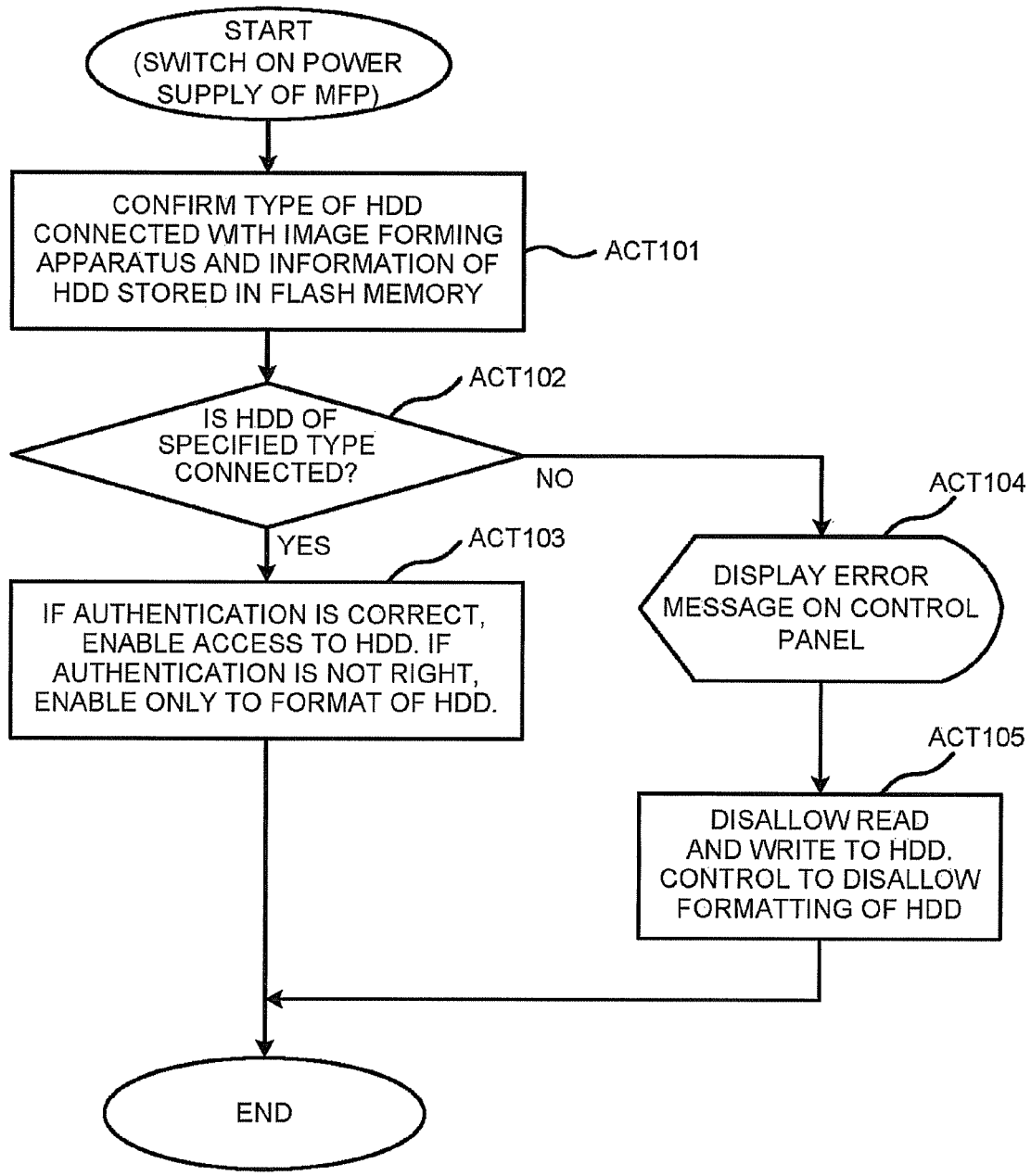
FIG. 3 is a flow chart showing an action example when a power supply of the image forming apparatus is in a switch-on state.

An action example when the power supply of the image forming apparatus 100 is switched on after the action in FIG. 2 is carried out is shown in a flow chart in FIG. 3. When the power supply of the image forming apparatus 100 is in a switch-on state, the control board 800 determines the type of the HDD by exchanging the specified signal. The control board 800 further acquires the authentication data from the flash memory 803 and confirms whether or not the authentication data is consistent with the encryption key of the authentication data stored in the HDD 804 (ACT 101).

The control board 800 judges whether or not the HDD 804 is the one of the specified type (ACT 102). In the conditions that the type of the HDD 804 and the specified type previously stored in the flash memory 803 are the same model (ACT 102: YES) and further the authentication data is consistent, the control board 800 allows a later access (the read in, the write in and the formatting of the data) to the HDD 804 (ACT 103). Subsequently, in the present embodiment, the authentication processing is not only carried out, but also the access can be carried out.

On the other hand, in the conditions that the HDD 804 is the one of the specified type (ACT 102: YES) and further the authentication processing using the authentication data is not consistent, the control board 800 only allows the formatting towards the HDD 804 but does not allow the read in and the write in of the data (ACT 103). In such a condition, the HDD can be accessed in a way with the authentication function by carrying out the setup processing the same as the ACT 001 and the ACT 002.

On the other hand, in the condition that the HDD 804 is not the one of the specified type (ACT 102: NO), the control panel 810 displays an error message (ACT 104). Moreover, the control board 800 carries out control in the way that the later data read in and data write in towards the HDD 804 cannot be implemented (are disabled), so as to carry out the control in the way that the formatting cannot be also implemented.

The actions described in FIG. 3 form the following actions of: disabling the access of the read and the write except the formatting for the HDD which is not subjected to the setup processing described in FIG. 2, and allowing the access of the formatting, the read and the write for the HDD subjected to the setup process.

Figure 4:
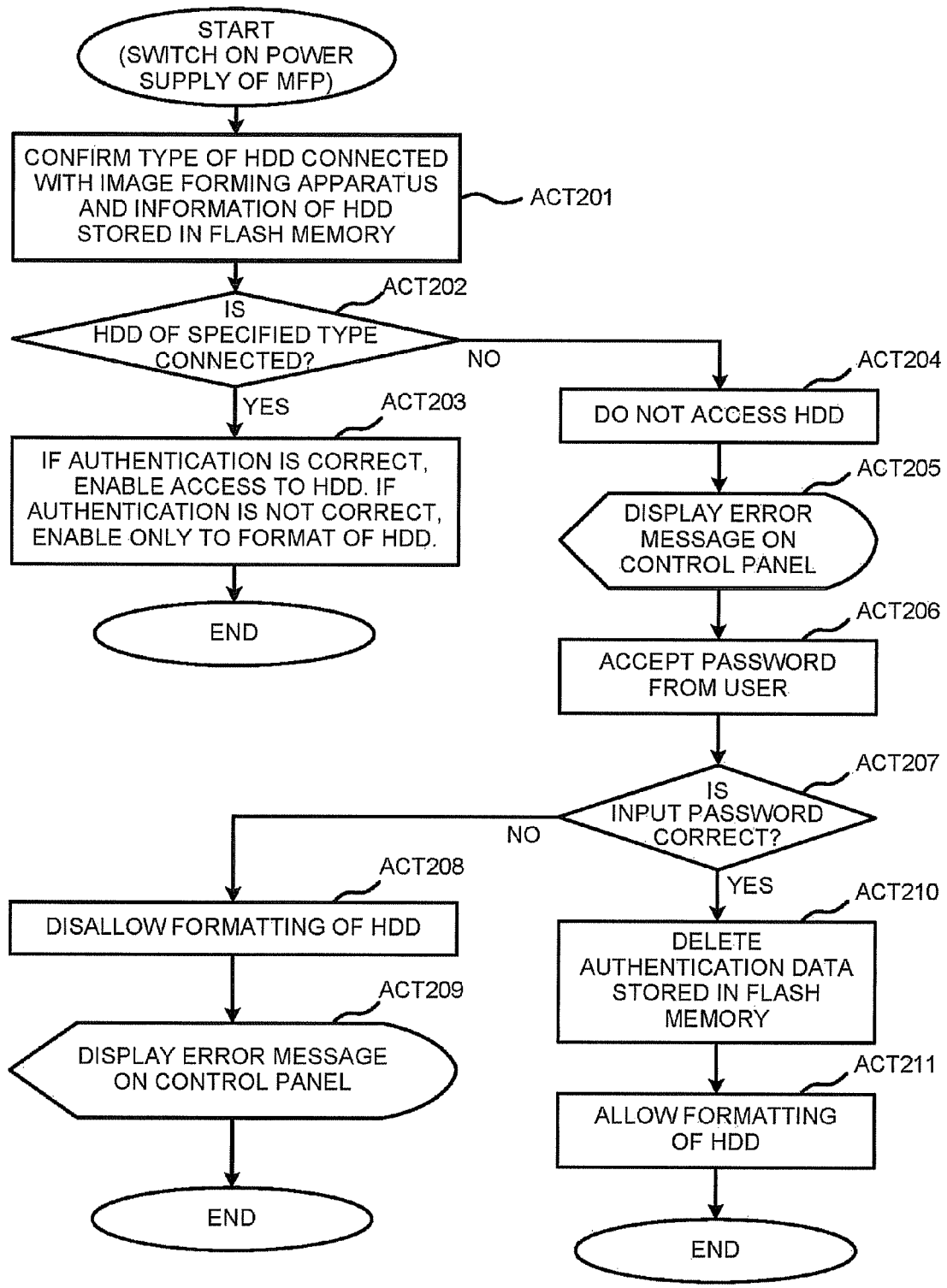
FIG. 4 is a flow chart (with password authentication) showing an action example when the power supply of the image forming apparatus is in the switch-on state.

On the other hand, in the example in FIG. 3, as even the formatting is also not allowed for the HDD whose type is different, in the condition that a bad condition occurs in the used HDD, the HDD cannot be replaced with other HDD easily. An action example overcoming the problem is shown in a flow chart in FIG. 4.

ACT 201, ACT 202 and ACT 203 are the same as the ACT 101, ACT 102 and ACT 103 in FIG. 3, and therefore, the descriptions are omitted. In ACT 202, if the HDD 804 is different from the specified type (ACT 202: NO), the control board 800 carries out the control such that the access (reading, writing, and formatting) to the HDD 804 is not allowed (ACT 204).

The control board 800 displays the error message on the control panel 810 (ACT 205). The password input screen is also correspondingly displayed. The control board 800 carries out password authentication by comparing the password acquired through the screen with the password previously registered in the flash memory 803 (ACT 207). If the password authentication is consistent, that is, the input password is consistent with the previously stored password (ACT 210: YES), the control board 800 cancels the authentication data registered in the flash memory 803 and stored in ACT 002 (ACT 210), and carries out the control such that formatting of the HDD 804 (ACT 211) is allowed. After the formatting is carried out, access to the HDD (reading, writing, and formatting) can be carried out. Thus, reading and writing can be carried out even without the authentication function.

On the other hand, in the condition that the password authentication is not consistent (ACT 207: NO), the control board 800 enables the read and the write towards the HDD and the formatting of the HDD to be always not allowed (ACT 208) and displays the error message (ACT 209).

Figure 5:
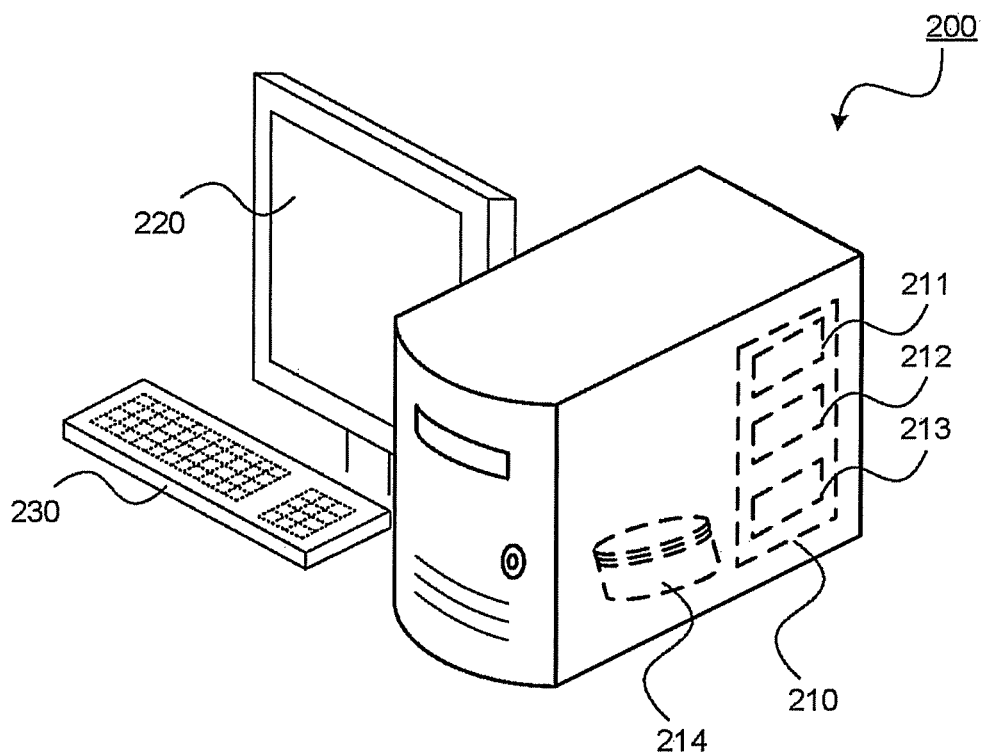
FIG. 5 is a schematic diagram showing an example of a computer.

In the above embodiment, the setting of an apparatus provided with the HDD as the image forming apparatus is described, but the way is not limited to that. For instance, as shown in FIG. 5, the invention can be also applied to a computer. The computer 200 in FIG. 5 comprises a control board 210 including a processor 211, an RAM 212, and a flash memory 213, moreover, an HDD 214 is assembled in the computer 200. The control board 210 is capable of controlling the access to the HDD 214 in accordance with a flow the same as those in FIG. 2 to FIG. 4. In addition, the computer 200 comprises a monitor 220 and a keyboard 230 and displays the message towards the user or accepts the input from the user. In addition, the way of the above embodiment can be further applied to a tablet computer or a portable telephone.

The controller is equivalent to the control board 800 or the control board 210 of the embodiment.

In the present embodiment, the setting of the storage apparatus as the HDD is described, the setting of the storage apparatus as a built-in HDD is described, but an external HDD can be also available, and moreover, a storage apparatus carrying out storage in a nonvolatile way, such as a USB (Universal Serial Bus) memory and the like, can be also set as the storage apparatus. Such a storage apparatus is connected with the controller whether wired or wireless.

In the present embodiment, the condition that the function implementing the invention is previously recorded in the apparatus is described, but is not limited to that, the same function can be downloaded in the apparatus from a network, and a unit storing the same function in a record medium can be also installed in the apparatus. As the record medium, so long as the record medium is capable of storing the program, such as a CD-ROM and the like, and further, the apparatus is capable of reading the record medium, the form of the record medium can be in any forms. In addition, for such a function acquired by previous installing or downloading, the function can be also realized by acting cooperating with an OS (operating system) and the like in the apparatus.

As described in detail above, according to the technology recorded in the present specification, even for the storage apparatus, the read and the write of the data of which are disabled, if the password authentication is consistent, the formatting can be also carried out, and the read and the write of the data can be also carried out. Therefore, the replacement with other HDD can be realized.

While certain embodiments have been described, these embodiments have been presented byway of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A controller for controlling a connected storage apparatus, comprising:
   a storage unit; and
   a controller configured to
   specify a type of the storage apparatus;
   in response to a determination that the storage apparatus corresponds to the type specified by the controller unit:
   carry out an authentication of the storage apparatus by using authentication data that is stored in the storage unit and that enables reading of data from and writing of data to the storage apparatus; and
   prohibit reading of data from and writing of data to the storage apparatus and allow formatting of the storage apparatus in response to a determination that the authentication is not consistent;
   in response to a determination that the storage apparatus does not correspond to the type specified by the controller unit:
   acquire a first password as an input from a user,
   judge whether or not the first password is consistent with a second password previously registered in the storage unit,
   in response to a determination that the first password is consistent with the second password previously registered in the storage unit:
   delete the authentication data, and
   allow formatting toward the storage apparatus, and
   in response to a determination that the first password is not consistent with the second password previously registered in the storage unit:
   prohibit reading of data from, writing of data to, and formatting of the storage apparatus.

2. The controller according to claim 1, wherein the controller is further configured to display a screen for inputting the first password on a display and acquire the password in response to the determination that the storage apparatus does not correspond to the type specified by the controller unit.

3. The controller according to claim 1, wherein the controller is further configured to allow reading of data from and writing of data to the storage apparatus in response to the determination that the storage apparatus corresponds to the type specified by the controller unit and a determination that the authentication is consistent.

4. The controller according to claim 1, wherein the storage apparatus is a storage apparatus of an image forming apparatus.

5. A method for controlling a storage apparatus connected with an apparatus that comprises a processor and a storage unit, comprising:
   in response to determining that the storage apparatus corresponds to a predefined type of storage apparatus:
   performing an authentication of the storage apparatus by using authentication data that is stored in the storage unit and that enables reading of data from and writing of data to the storage apparatus; and
   prohibiting reading of data from and writing of data to the storage apparatus and allowing the formatting in response to a determination that the authentication is not consistent;
   in response to determining that the storage apparatus does not correspond to the predefined type specified by the controller unit:
   acquiring a first password as an input from a user;
   judging whether or not the first password is consistent with a second password previously registered in the storage unit;
   in response to determining that the first password is consistent with the second password previously registered in the storage unit:
   deleting the authentication data, and
   allowing formatting of the storage apparatus; and
   in response to determining that the first password is not consistent with the second password previously registered in the storage unit:
   prohibiting reading of data from, writing of data to, and formatting of the storage apparatus.

6. The method according to claim 5, further comprising
   in response to determining that the storage apparatus does not correspond to the predefined type, displaying a screen for inputting the first password on a display and acquiring the password.

7. The method according to claim 5, further comprising allowing reading of data from and writing of data to the storage apparatus in response to the determination that the storage apparatus corresponds to the type specified by the controller unit and a determination that the authentication is consistent.

8. The method according to claim 5, wherein the storage apparatus is a storage apparatus of an image forming apparatus.

* * * * *